Aug. 30, 1960

P. MILLER 2,951,156

METHOD AND APPARATUS FOR PREDICTING THE
RESIDUAL LIFE OF ADSORPTION BEDS

Filed May 24, 1955

INVENTOR
Philip Miller
BY
Emmet A. Joenen
ATTORNEY

Aug. 30, 1960

P. MILLER 2,951,156

METHOD AND APPARATUS FOR PREDICTING THE
RESIDUAL LIFE OF ADSORPTION BEDS

Filed May 24, 1955

INVENTOR
Philip Miller
BY
Ernest A. Greenen
ATTORNEY

United States Patent Office 2,951,156
Patented Aug. 30, 1960

2,951,156

METHOD AND APPARATUS FOR PREDICTING THE RESIDUAL LIFE OF ADSORPTION BEDS

Philip Miller, East Norwich, N.Y., assignor to Walter Kidde Nuclear Laboratories, Inc., Garden City, N.Y., a corporation of New York Filed May 24, 1955, Ser. No. 511,439

10 Claims. (Cl. 250—43.5)

The present invention relates to gas separation, and, more particularly, to a method of and an apparatus for predicting the residual life of a bed for the adsorption of unwanted matter in a fluid stream.

The present invention is primarily concerned with predicting the residual life of beds of activated charcoal for adsorbing various unwanted vapors in a gaseous stream, although the principles involved herein are adaptable for other similar or analogous uses. The present invention can be employed to great advantage in connection with charcoal beds of large cross-sectional area. In such cases, means are required for determining the residual capacity of such beds for adsorbing the unwanted vapors in the stream, particularly, at times when it is presumed that they have lost at least a portion of their initial capacity—either through exposure to the unwanted matter or merely through the effect of age and ambient conditions while idle.

Heretofore, no satisfactory method for determining the residual life of such beds has been known. A number of methods have been proposed which have in common the feature that a small sample or test bed is exposed to the same life history as a main bed by passing a sample of the fluid stream therethrough. The residual life of the sample bed is determined by various measurements and the result is assumed to be the residual life in the main bed.

It is known that the residual life of a charcoal bed is a function of many variables, not all of which are well-established for all unwanted matter, for example, noxious or poisonous gases. However, it is generally true that two of the most important factors which determine residual life are the weight of the unwanted matter and the weight of moisture adsorbed on the bed, and the distribution or location of the adsorbate on the bed. Various methods have been proposed for determining the weight of the adsorbate, including simply weighing the bed or measuring the absorption of beta or gamma radiations through the bed in the direction of flow of the fluid stream. Other methods have been proposed for determining the location of the adsorbate, including the measuring of local temperature effects that accompany adsorption.

Any of these known methods used alone does not enable both the mass and distribution of the unwanted matter to be determined whereby such methods are inadequate. If several of these methods are used in an attempt to procure adequate information, the test apparatus is unduly complicated and the test procedure is prolix.

Accordingly, an object of the present invention is to provide a method of and an apparatus for accurately determining both the weight and distribution of the adsorbate within the bed in a simple, practical and reliable manner.

Another object is to provide such a method and apparatus for exactly predicting when the main bed is unfit for further safe use and requires replacement, whereby the bed is neither operated to create a hazard nor any useful residual capacity is wasted by premature replacement.

Another object is to provide such a method and apparatus wherein the measurements can be made by persons of ordinary skill and sets of such measurements, when plotted, give a very realistic diagrammatic picture of the bed in a depthwise direction.

Another object is to provide such apparatus which includes mechanism for accurately taking measurements at pre-selected points spaced depthwise with respect to the test bed.

A further object is to provide such apparatus which is simple in construction and economical to manufacture.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by continuously passing a sample of a fluid stream containing the unwanted matter through a test bed corresponding in composition and depth to the main bed in a manner whereby main bed and the test bed have the same life history, directing beta radiations through the test bed transversely with respect to the direction of flow of the stream, and measuring the beta radiations passing through the test bed, whereby the amount of unwanted matter adsorbed by the test bed can be determined to predict the condition of the main bed.

A preferred embodiment of the invention has been chosen for purposes of illustration and description, and is shown in the accompanying drawing, forming a part of the specification, wherein.

Figure 1:
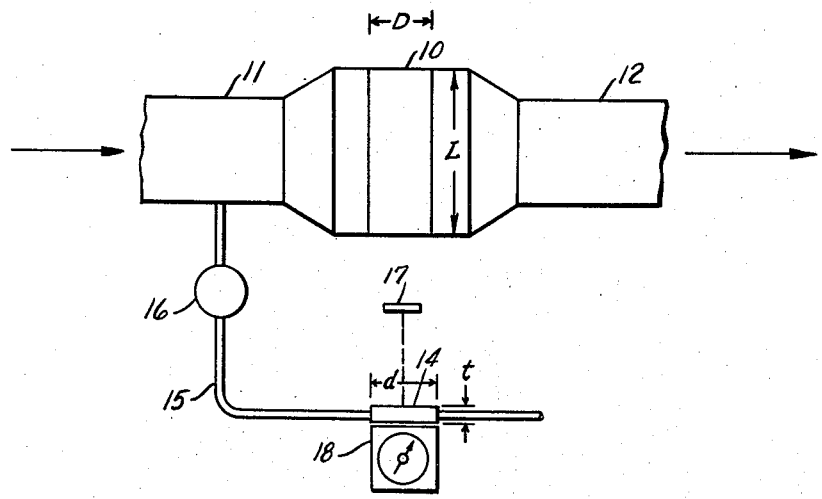
Fig. 1 is a schematic view of apparatus in accordance with the present invention including the main bed, the test bed and the measuring apparatus for the test bed.

Referring to Fig. 1 of the drawings in detail, apparatus is shown which generally comprises a main adsorption bed 10, for example an activated charcoal type bed, an influent stream conduit 11 for conducting a gaseous fluid such as air carrying an unwanted adsorbable vapor and an effluent stream conduit 12 between which the main bed is connected, a test bed 14 corresponding in composition to the main bed, a conduit 15 for conducting a sample of the stream from the influent conduit 11 to the test bed having a flow regulating valve 16 connected therein, a source 17 of beta radiations adjacent the test bed, and a gage 18 for measuring beta radiations passing through the test bed.

Figure 2:
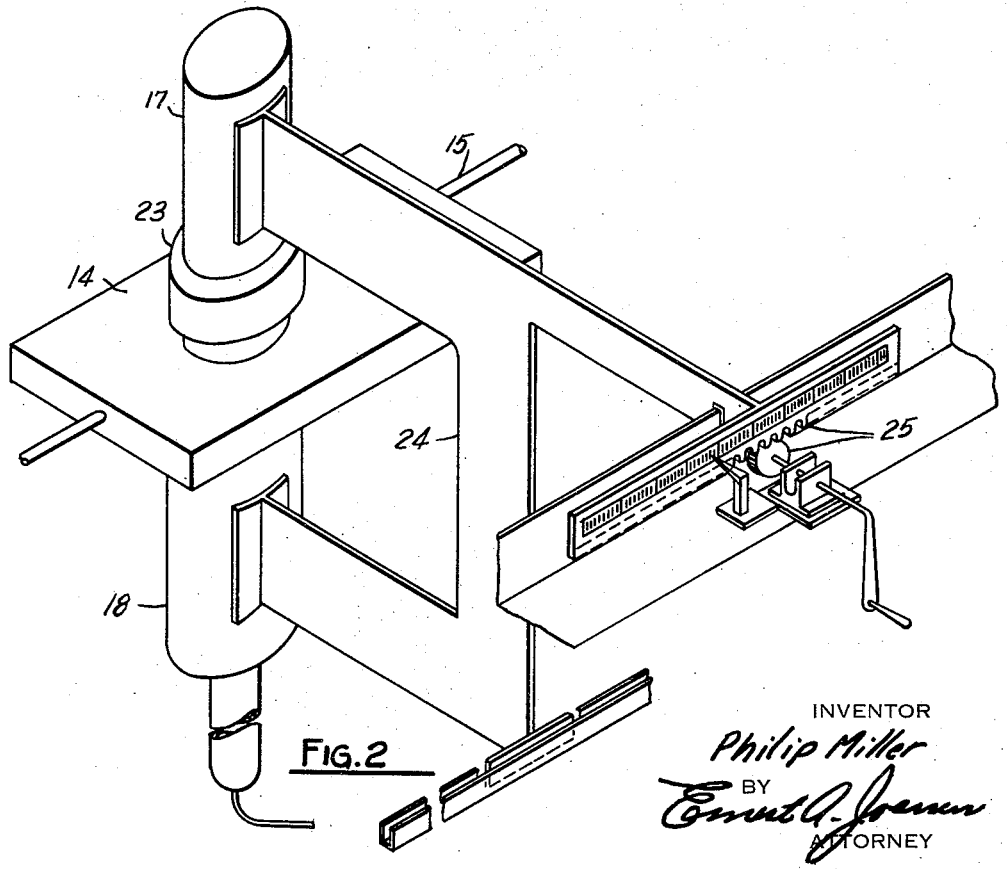
Fig. 2 is an isometric view illustrating the measuring apparatus for the test bed.
Figure 3:
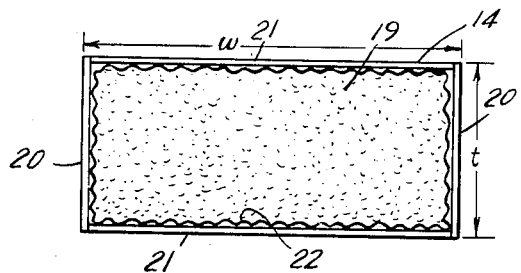
Fig. 3 is a sectional view illustrating the cross-section of the test bed and the holder enclosing the same.

As shown more particularly in Figs. 2 and 3, the test bed is in the form of a rectangular slab 19 of greater length and width than thickness, and is so arranged that the beta radiations pass through the thickness thereof and the sample stream of gaseous fluid flows lengthwise therethrough. The length dimension corresponds to the thickness or depth dimension of the main bed and is referred to herein as the depth of the bed. The cross-sectional area of the test bed is but a small fraction of the surface area of the main bed exposed to the influent gaseous stream so that, by proportioning the sample stream in relation to these main and test bed areas, the life histories of the beds are substantially identical.

The test bed is enclosed in a holder which comprises side walls 20 and upper and lower side wall members 21 constructed of a thin sheet of metal, such as aluminum, in order to minimize absorption of beta rays.

In a practical embodiment of the invention, the cross-section of the main bed normal to the direction of flow may be square, each side L (Fig. 1) being 4 feet long, the depth D of the bed in the direction of flow being, say 1⅛ inches. The test bed 14 may be a test bed slab having a depth (length) $d$ of 1⅛ inches (the same as for the main bed 10), a width $w$ (Fig 3) of 1½ inches and a thickness $t$ of about ¼ inch. The thickness must be so limited in order that suitable sensitivity in beta radiation absorption changes can be obtained with beta radiation sources that are practically available. For example, a slab of such a thickness sandwiched between thin aluminum sheets enables good results to be obtained with a $Sr^{90}$-$Y^{90}$ beta source.

For the specific embodiment described above, the cross-sectional area of the main bed 10 normal to the direction of flow is 16 square feet, whereas the cross-sectional area of the test bed 14 normal to the direction of flow is .00261 square feet. For the life histories of the test bed and the main bed to be the same, therefore, the volume flow rates through them should be adjusted to have the same ratio as the cross-sectional areas, as indicated above.

The use of a test bed of such small thickness may cause the behavior of the test bed not to correspond to that of the main bed due to excessive leakage or channeling of the sample stream between the slab 19 and the side walls 20 and/or 21.

To avoid this, the walls 20 and/or 21 are lined with a soft compressible material 22, such as tissue paper, blotting paper or felt, which tends to fill the voids between the walls and the outer grains of the test bed, or these walls may be dimpled, corrugated or embossed in a manner to reduce such voids.

The beta radiation source is enclosed in a casing or shield 23 having an outlet slit of about 1/16 inch in width and about ¾ inch in length. This slit faces the upper side of the test bed holder through which the radiations are directed. The gage is at the opposite side of the holder with its responsive element facing the underside of the lower wall 21 and in vertical alignment with the slit of the source casing.

Preferably, the casing and sensitive or responsive element of the gage are both supported by a yoke or bracket 24 mounted for slidable movement, back and forth, in the direction of flow of the sample stream, so that beta radiation readings can be taken at spaced points along the depth (length) of the test bed. A gear and rack, and scale and pointer arrangement 25 is provided to accurately determine the exact location of the reading taken through the test bed.

The gage may be of any conventional type for measuring beta radiation. The face of the gage may be arranged to read adsorption values directly or such readings may be obtained by using suitable calibration curves. For example, the condition of the test bed may be determined by obtaining readings which, when converted or calibrated, indicate the mass of unwanted matter adsorbed by a unit of mass of charcoal bed. In making such determinations, the apparatus is set up to read the absorption of beta radiations due to contamination of the bed to obtain this mass relationship.

Figure 4:
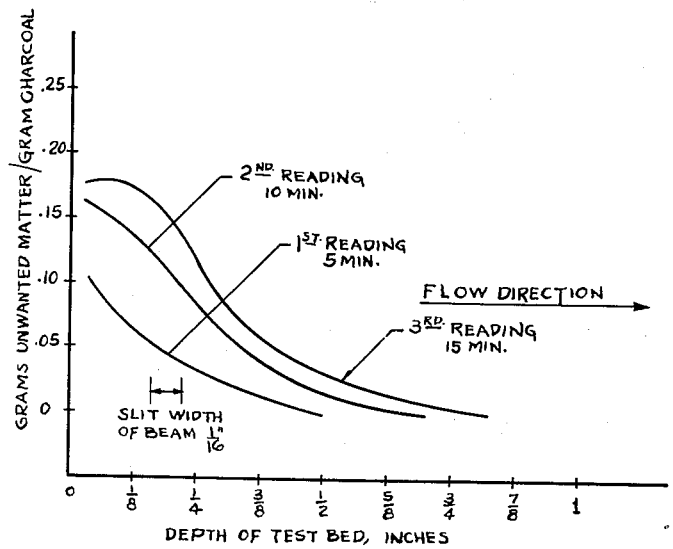
Fig. 4 is a diagram illustrating the depthwise distribution of the unwanted matter in the test bed at different intervals of time.

In Fig. 4, a diagram is shown which was obtained by taking readings of beta radiation absorption along the depth (length) of the test bed at points spaced about one sixteenth of an inch apart, whereby the one sixteenth inch beam covered the entire depth of the test bed insofar as it was investigated in each instance. Three sets of such readings were taken after contaminated gas had been passed through the main and test beds. The first reading indicated that contamination extended into the bed for about ½ inch, the second reading indicated that contamination extended about 7/16 inch and the third reading indicated that contamination extended to 13/16 inch, whereby the residual life of the main bed could be predicted. These readings can also be utilized to determine the distribution of the contaminant in the bed and to calculate the mass of contaminant within the bed.

As a safety precaution in actual operation, when contamination has penetrated to about ¾ inch within the bed, the bed is considered unfit for safe use and is reactivated or replaced. In this manner, penetration or breakthrough by the unwanted matter is prevented.

From the foregoing description, it will be seen that the present invention provides a novel and useful method of and apparatus for predicting the residual life of adsorption beds by periodically scanning the test bed depthwise for beta ray absorption due to penetration of the adsorbate.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In combination, a main bed of given depth for the adsorption of unwanted matter in a fluid stream passing through said bed in the direction of the depth thereof, a test bed of the same composition and depth as said main bed and having a cross-sectional area in fixed proportion to the cross-sectional area of the main bed at different depths therealong, means for passing fluid from said stream depthwise through said main and test beds at volume flow rates proportional, respectively, to the cross-sectional areas of said main and test beds, and means for determining a radiation transmission property of said test bed transversely of the direction of fluid flow therein at different depths therealong, whereby the distribution of unwanted matter in said test bed can be ascertained from which the condition of said main bed can be predicted.

2. In combination, a main bed of given depth for the adsorption of unwanted matter in a fluid stream passing through said bed in the direction of the depth thereof, a test bed of the same composition and depth as said main bed and having a cross-sectional area in fixed proportion to the cross-sectional area of the main bed at different depths therealong, means for passing a fluid stream containing the unwanted matter through said main bed and depthwise passing a sample thereof through said test bed in proportion to the area relationship of said beds so as to establish volume flow rates of said fluid stream and of said sample that are in the same ratio as said cross-sectional areas, means for directing beta radiations transversely through said test bed from one side thereof, gage means at the other side of said test bed responsive to beta radiations passing through said test bed, and means for mounting said directing means and said gage means for movement as a unit in the direction of flow of the stream whereby said test bed can be scanned to determine the distribution of the unwanted matter in said test bed to predict the condition of said main bed.

3. In a method for predicting the condition of a main bed of given depth for the adsorption of unwanted matter in a fluid stream passing through said bed in the direction of the depth thereof, the steps of passing fluid from said stream depthwise through a test bed of the same depth and composition as said main bed and having a cross-sectional area in fixed proportion to the cross-sectional area of the main bed at different depths therealong, adjusting the flow of fluid through said test bed to a volume flow rate that is in the same ratio to the volume flow rate of the fluid through the main bed as the ratio between the cross-sectional areas of the test bed and the main bed, and obtaining indications of a radiation transmission property of said test bed transversely of the direction of fluid flow therein at different depths therealong, whereby the distribution of unwanted matter in said test bed can be ascertained from which the condition of said main bed can be predicted.

4. Apparatus for observing the condition of a bed for the adsorption of unwanted matter in a fluid stream comprising a test bed, means for passing a fluid stream containing unwanted matter through said test bed, means at one side of said test bed for directing beta radiations through said test bed transversely with respect to the direction of flow of the stream, gage means at the opposite side of said test bed for measuring the beta radiations passing through said test bed, and means for mounting said directing means and said gage means for movement as a unit in the direction of flow of the stream, whereby said test bed can be scanned to determine the distribution of the unwanted matter in said test bed.

5. Apparatus according to claim 4, wherein said test bed is in the form of a slab and said beta radiations pass through said slab in the direction of its thickness.

6. Apparatus according to claim 5, wherein said test bed slab is rectangular and its thickness dimension is less than its length and width dimensions.

7. Apparatus according to claim 6, including a holder for said slab having side walls in the path of the beta radiations constructed and dimensioned to minimize their absorption of beta rays and fluid stream inlet and outlet means at opposite sides of said slab defined by the thickness dimension and one of the other dimensions.

8. Apparatus according to claim 7, wherein said holder has walls for enclosing the remaining opposite sides of said slab.

9. Apparatus according to claim 8, wherein means are provided at said walls to prevent excessive leakage of fluid between said slab and said walls.

10. The method of observing the condition of a main bed for the adsorption of unwanted matter in a fluid stream, which method comprises passing through a test bed a fluid stream containing the unwanted matter, directing beta radiations through the test bed transversely with respect to the direction of flow of the stream, and measuring the beta radiations passing through the test bed at spaced points in the direction of flow of the stream, whereby the amount and distribution of unwanted matter adsorbed by the test bed can be determined to predict the condition of the main bed.

References Cited in the file of this patent

UNITED STATES PATENTS

| | | |
|---|---|---|
| 2,567,057 | Crumrine | Sept 4, 1951 |
| 2,613,326 | Herzog | Oct. 7, 1952 |
| 2,641,710 | Pompeo et al. | June 9, 1953 |
| 2,674,363 | Graham | Apr. 6, 1954 |